US012562963B2

(12) United States Patent
  Karampatsis et al.

(10) Patent No.:  US 12,562,963 B2
(45) Date of Patent:  Feb. 24, 2026

(54) UPDATING AN APPLICATION DATA SET WITH N6-LAN STEERING INFORMATION

(71) Applicant: Lenovo (Singapore) Pte. Ltd., New Tech Park (SG)

(72) Inventors: Dimitrios Karampatsis, Ruislip (GB); Apostolis Salkintzis, Athens (GR); Genadi Velev, Darmstadt (DE); Ishan Vaishnavi, Munich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 282 days.

(21) Appl. No.: 18/547,280

(22) PCT Filed: Feb. 19, 2021

(86) PCT No.: PCT/EP2021/054218
  § 371 (c)(1),
  (2) Date: Aug. 21, 2023

(87) PCT Pub. No.: WO2022/174921
  PCT Pub. Date: Aug. 25, 2022

(65) Prior Publication Data
  US 2024/0031231 A1  Jan. 25, 2024

(51) Int. Cl.
  *H04L 41/0893*  (2022.01)
  *H04L 41/5054*  (2022.01)
(52) U.S. Cl.
  CPC ...... *H04L 41/0893* (2013.01); *H04L 41/5054* (2013.01)
(58) Field of Classification Search
  CPC .. H04L 41/0893; H04L 41/5054; H04L 67/63
  See application file for complete search history.

(56) References Cited

U.S. PATENT DOCUMENTS

2020/0112850 A1  4/2020  Lee et al.
2020/0145876 A1*  5/2020  Dao ..................... H04L 12/1407
  (Continued)

FOREIGN PATENT DOCUMENTS

WO  2021017381 A1  2/2021
WO  2021028435 A1  2/2021

OTHER PUBLICATIONS

PCT/EP2021/054218, "International Search Report and the Written Opinion of the International Searching Authority, or the Declaration", International Searching Authority, Oct. 25, 2021, pp. 1-15.
  (Continued)

*Primary Examiner* — Gil H. Lee
(74) *Attorney, Agent, or Firm* — Kunzler Needham & Hilton

(57)  ABSTRACT

Apparatuses, methods, and systems are disclosed for configuring N6-LAN chain policies. One apparatus includes a processor and a network interface that receives a first request from an application function ("AF"), the first request comprising an external identifier for at least one user equipment ("UE") and N6-LAN steering information indicating a service function or a chain of service functions in the N6-LAN that must process the user-plane traffic associated with the at least one UE. The processor translates the external identifier into a permanent subscription identifier of the at least one UE and sends a second request to a first network function to update an application data set to include the N6-LAN steering information and the permanent subscription identifier.

15 Claims, 10 Drawing Sheets

(56)  References Cited

U.S. PATENT DOCUMENTS

| | | | | |
|---|---|---|---|---|
| 2020/0404106 A1* | 12/2020 | Belling | .................. | H04W 8/10 |
| 2022/0109633 A1* | 4/2022 | Li | ........................ | H04W 48/08 |
| 2023/0164641 A1* | 5/2023 | Purkayastha | ..... | H04W 36/0022 |
| | | | | 370/331 |

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.
3GPP, "3rd Generation Partnership Project; Technical Specification Group Services and System Aspects; Policy and charging control framework for the 5G System (5GS); Stage 2 (Release 16)", 3GPP TS 23.503 V16.7.0, Dec. 2020, pp. 1-119.

* cited by examiner

800

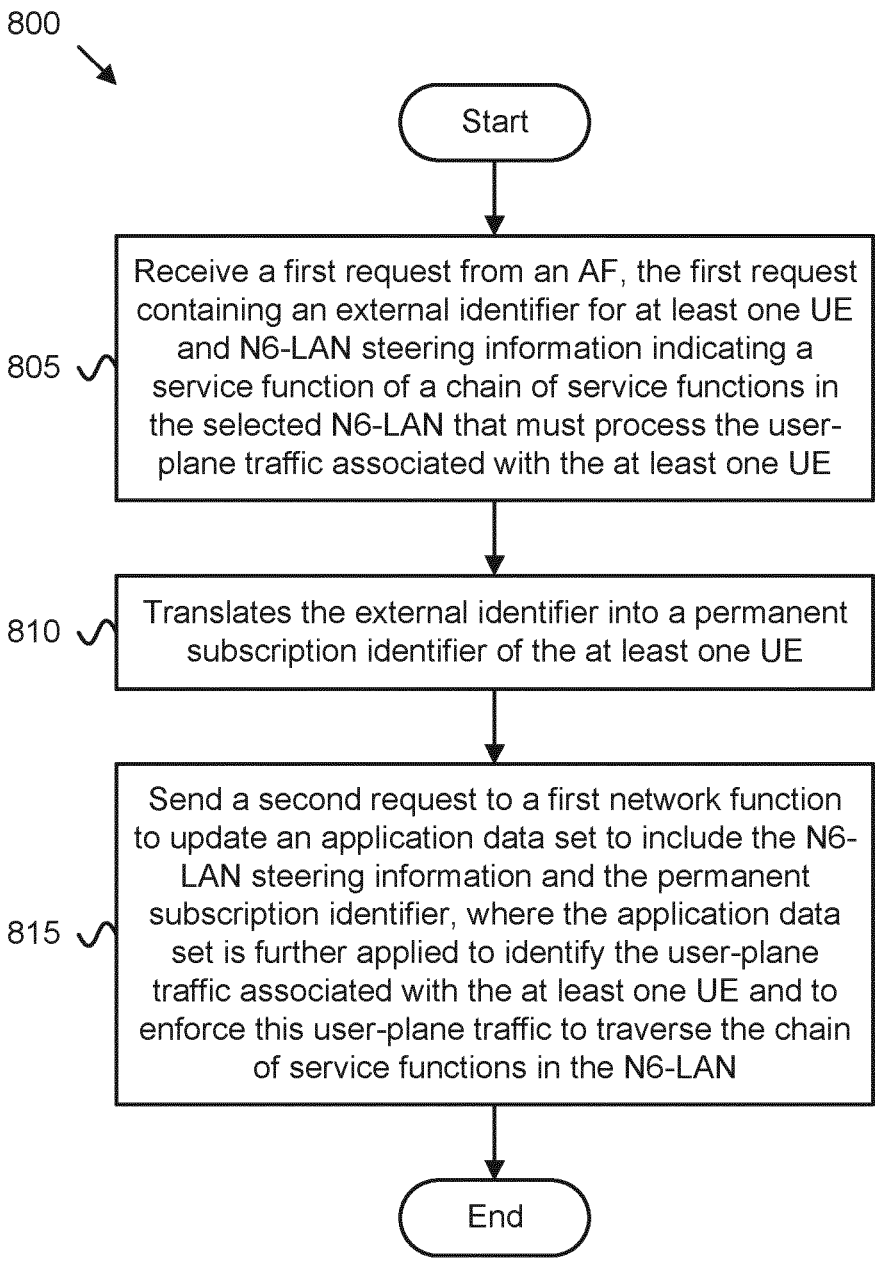

Start

805

Receive a first request from an AF, the first request containing an external identifier for at least one UE and N6-LAN steering information indicating a service function of a chain of service functions in the selected N6-LAN that must process the user-plane traffic associated with the at least one UE

810

Translates the external identifier into a permanent subscription identifier of the at least one UE

815

Send a second request to a first network function to update an application data set to include the N6-LAN steering information and the permanent subscription identifier, where the application data set is further applied to identify the user-plane traffic associated with the at least one UE and to enforce this user-plane traffic to traverse the chain of service functions in the N6-LAN End

FIG. 8

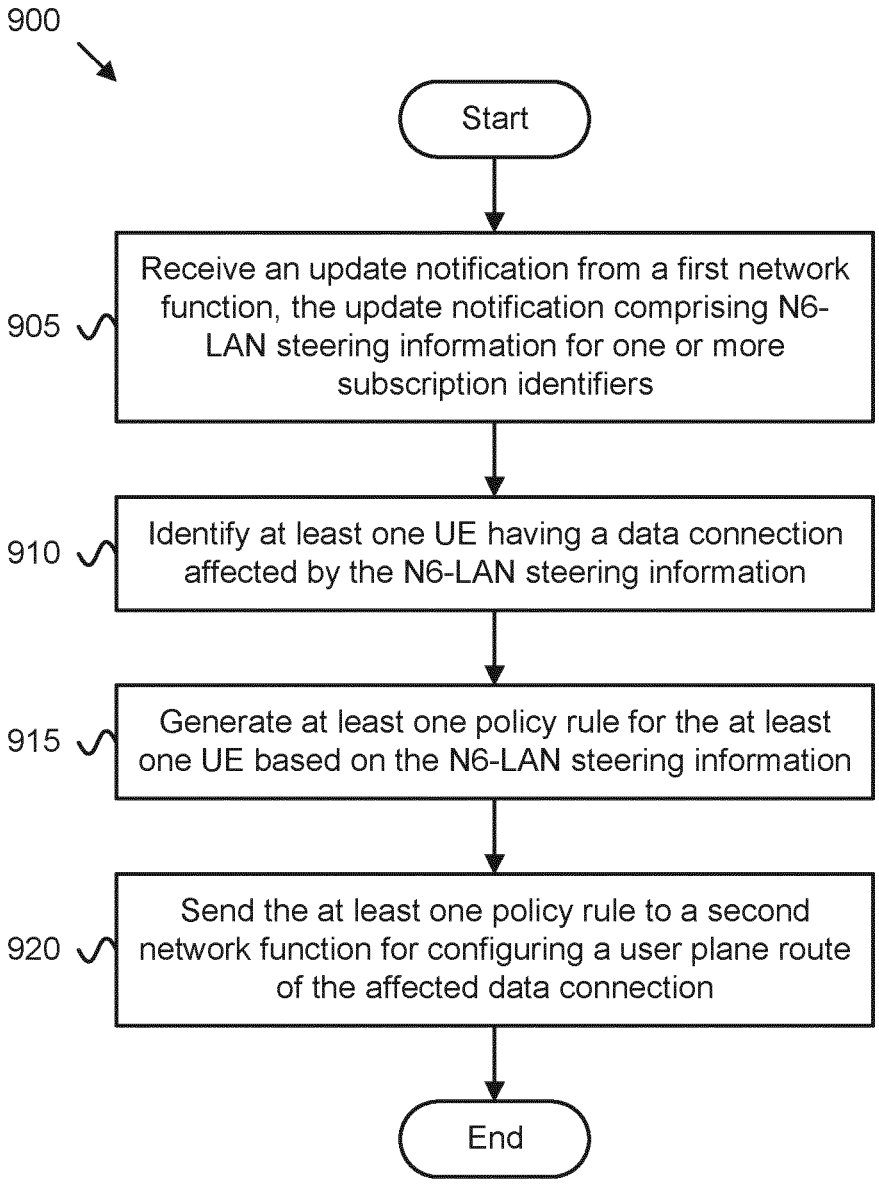

900

Start

905 — Receive an update notification from a first network function, the update notification comprising N6-LAN steering information for one or more subscription identifiers 910 — Identify at least one UE having a data connection affected by the N6-LAN steering information 915 — Generate at least one policy rule for the at least one UE based on the N6-LAN steering information 920 — Send the at least one policy rule to a second network function for configuring a user plane route of the affected data connection End

FIG. 9

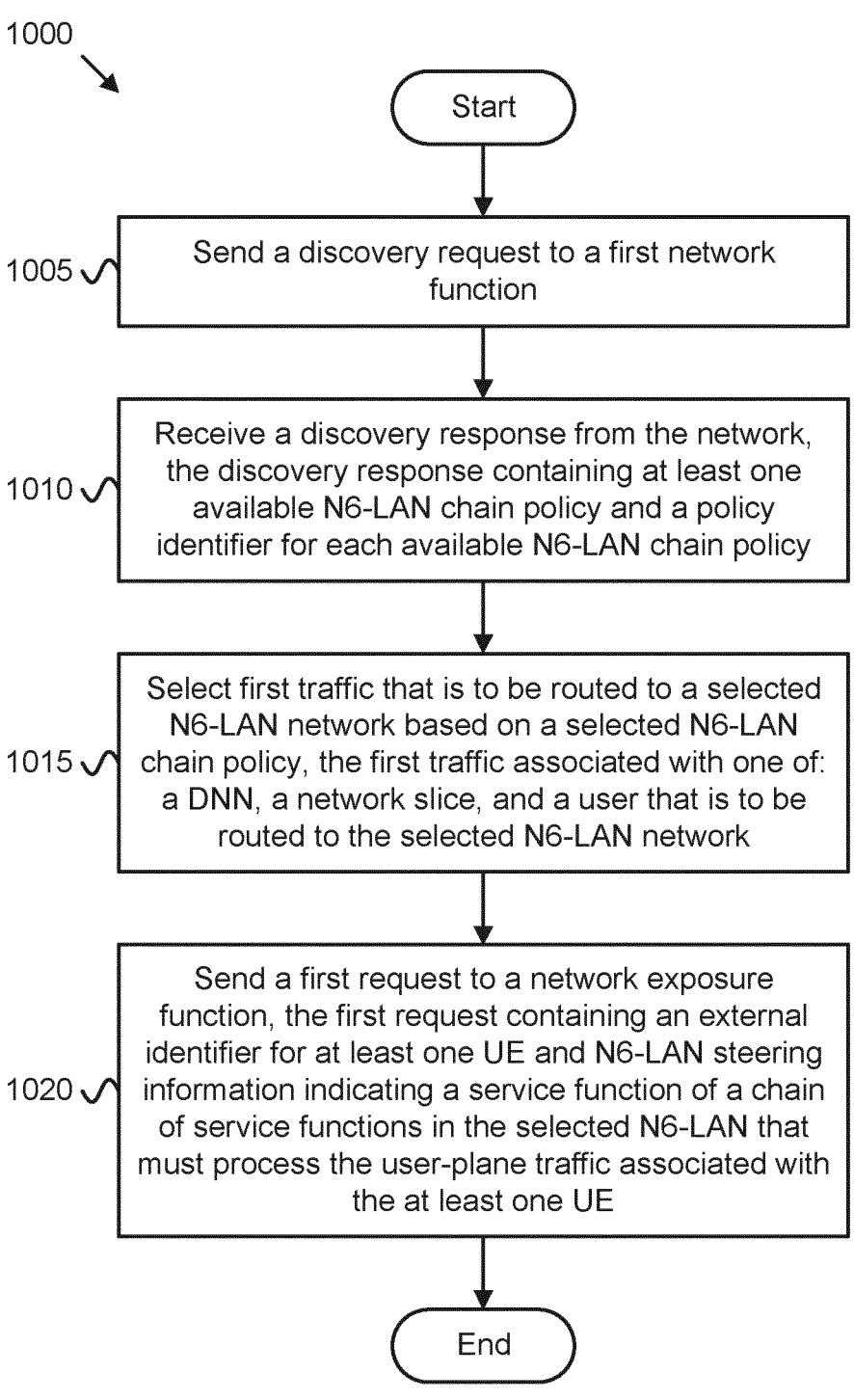

1000

Start

1005 — Send a discovery request to a first network function

1010 — Receive a discovery response from the network, the discovery response containing at least one available N6-LAN chain policy and a policy identifier for each available N6-LAN chain policy 1015 — Select first traffic that is to be routed to a selected N6-LAN network based on a selected N6-LAN chain policy, the first traffic associated with one of: a DNN, a network slice, and a user that is to be routed to the selected N6-LAN network 1020 — Send a first request to a network exposure function, the first request containing an external identifier for at least one UE and N6-LAN steering information indicating a service function of a chain of service functions in the selected N6-LAN that must process the user-plane traffic associated with the at least one UE End

FIG. 10

UPDATING AN APPLICATION DATA SET WITH N6-LAN STEERING INFORMATION

FIELD

The subject matter disclosed herein relates generally to wireless communications and more particularly relates to configure N6-LAN chain policies for a third-party Application Service Provider ("ASP"). As used herein, the term "N6-LAN" refers to the portion of the mobile communication network that carries data from the User Plane Function ("UPF") to the Internet.

BACKGROUND

N6-LAN in a Fifth-Generation ("5G") operator network allows a network operator to provide differentiated services to user plane traffic of user equipment devices ("UEs"). Example differentiated services are: Content Control, Anti-Malware, Network Address Translation, firewall, etc.

To support such differentiated services, a network operator hosts a Service Function Chain network, also known as, N6-LAN, where each function in the chain of service function supports specific services. Each service function in the N6-LAN network may support specific services.

BRIEF SUMMARY

Disclosed are procedures for configuring N6-LAN chain policies. Said procedures may be implemented by apparatus, systems, methods, or computer program products.

One method of a network equipment function ("NEF") for configuring N6-LAN chain policies includes receiving a first request from an application function ("AF"). Here, the NEF is a network function in a mobile communication network that comprises a mobile core network and an N6-LAN, where the N6-LAN comprises at least one service function that processes user-plane traffic. The first request contains an external identifier for at least one user equipment device ("UE") and N6-LAN steering information indicating a service function or a chain of service functions in the N6-LAN that must process the user-plane traffic associated with the at least one UE. The first method includes translating the external identifier into a permanent subscription identifier of the at least one user equipment device ("UE") and sending a second request to a first network function to update an application data set to include the N6-LAN steering information and the permanent subscription identifier. Here, the application data set is further applied to identify the user-plane traffic associated with the at least one UE and cause the identified user-plane traffic to traverse the chain of service functions in the N6-LAN.

One method of a policy control function ("PCF") for configuring N6-LAN chain policies includes receiving an update notification from a first network function, the update notification containing N6-LAN steering information for one or more subscription identifiers. The method includes identifying at least one UE having a data connection affected by the N6-LAN steering information and generating at least one policy rule for the at least one UE based on the N6-LAN steering information. The method includes sending the at least one policy rule to a second network function for configuring a user plane route of the affected data connection.

One method of an AF for configuring N6-LAN chain policies includes sending a discovery request to a first network function and receiving a discovery response from the network, the discovery response containing at least one available N6-LAN chain policy and a policy identifier for each available N6-LAN chain policy. The method includes selecting first traffic that is to be routed to a selected N6-LAN network based on a selected N6-LAN chain policy, the first traffic associated with one of: a data network name ("DNN"), a network slice, and a user that is to be routed to the selected N6-LAN network. The method includes sending a first request to a first network function, the first request containing an external identifier for at least one UE and N6-LAN steering information indicating a service function or a chain of service functions in the N6-LAN that must process the user-plane traffic associated with the at least one UE.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flowchart diagram illustrating one embodiment of a first method for configuring N6-LAN chain policies;

FIG. 9 is a flowchart diagram illustrating one embodiment of a second method for configuring N6-LAN chain policies; and FIG. 10 is a flowchart diagram illustrating one embodiment of a third method for configuring N6-LAN chain policies.

DETAILED DESCRIPTION

Figure 1:
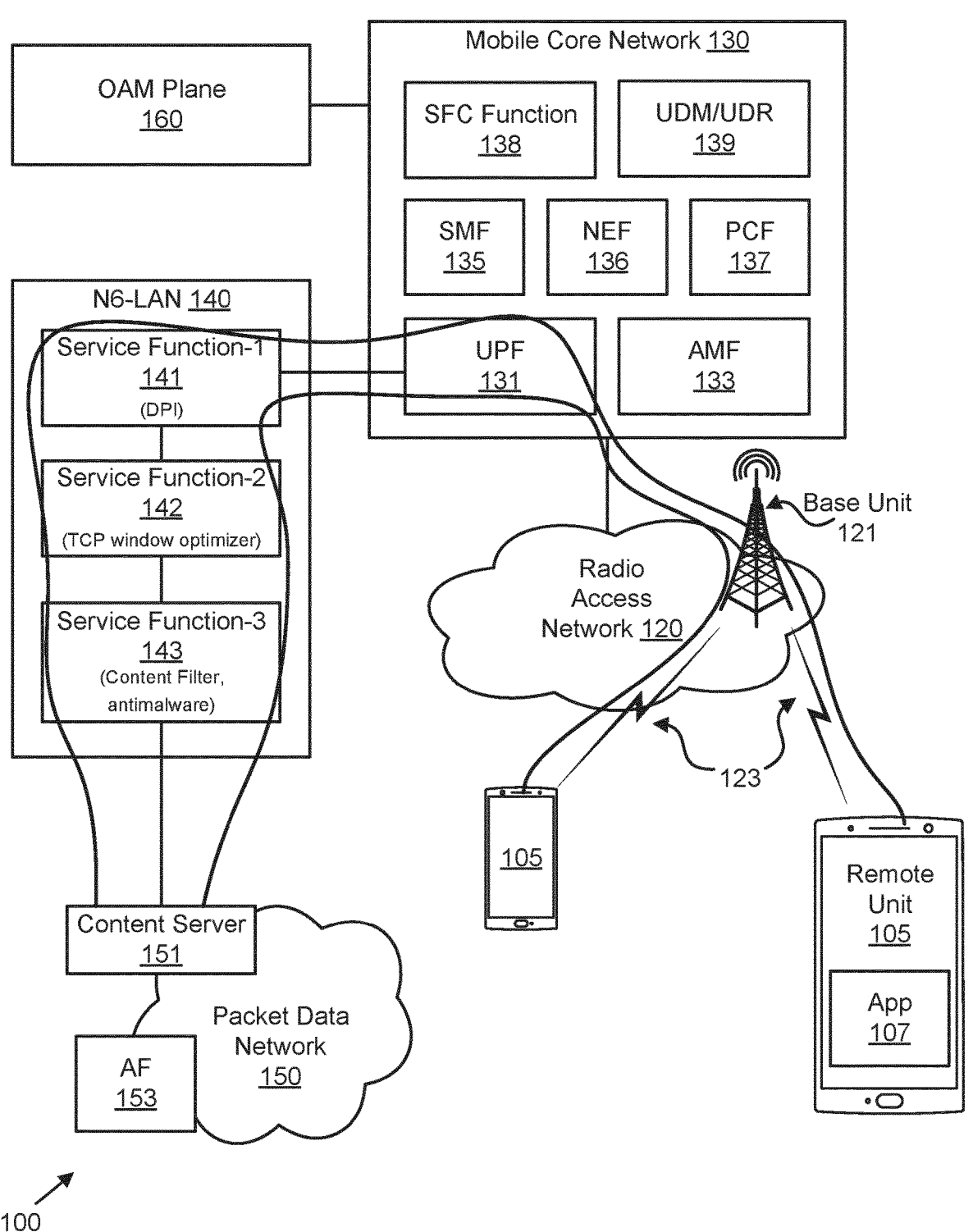
FIG. 1 is a block diagram illustrating one embodiment of a wireless communication system for configuring N6-LAN chain policies.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for configuring N6-LAN chain policies. The N6-LAN refers to the portion of the 5G mobile network (i.e., 5G System ("5GS") that carries data from the UPF to the Internet. It performs the same function as the S/Gi-LAN does in a Fourth-Generation ("4G") mobile network (i.e., Evolved Packet System ("EPS" Note that the N6-LAN is separate from the mobile core network (i.e., 5G core ("5GC") or Evolved Packet Core ("EPC")). This N6-LAN is also the point at which a number of very important network services are applied to traffic, for example, subscriber security services, local Domain Name System ("LDNS") services, carrier-grade Network Address Translation ("CG-NAT"), firewall and Distributed Denial of Services ("DDOS") protection, Transmission Control Protocol ("TCP") optimization, and video optimization.

As described above, a network operator supports differentiated services via a Service Function Chain network, also known as, N6-LAN, where each function in the chain of service function supports specific services for processing user-plane traffic. Each service function in the N6-LAN network may support services such as firewall functions, Deep Packet Inspection ("DPI"), Network Address Translation ("NAT"), antimalware, parental control, DDoS protection, TCP proxies, load balancers, Key Performance Indicator ("KPI") monitoring, and video optimization.

Currently a network operator determines how user plane traffic is routed within the N6-LAN network based on pre-configured routing policies. The network operator determines how user plane traffic should be routed within the N6-LAN network according to user subscription, Location of UE, User's current RAT, network load status, application identifier, time of day or access point name ("APN"). Such criteria are pre-configured and stored in a subscriber profile repository within the policy control function ("PCF") known as N6-LAN steering policies.

The PCF determines what N6-LAN steering policies are required to be activated based on the subscription profile and provides a policy and charging control ("PCC") rule to the session management function ("SMF") to enforce the steering policy. The SMF configures the N6-LAN steering policies at the UPF that allows the UPF to determine the functions within the N6-LAN network that the user plane traffic must traverse. How the traffic is steered to each Function within the N6-LAN network is based on Service Function Chaining ("SFC") mechanism defined in Internet Engineering Task Force ("IETF") standards.

The problem with this approach is that it requires the network operator to pre-configure all N6-LAN steering policies at the PCF. There is currently no mechanism defined to allow a third-party provider to indicate dynamically how a UE's user plane traffic should be routed within the N6-LAN network.

Solutions are presented herein to support third-party provisioning of service chain policies to a network operator and to support a third-party to indicate how to route UE traffic or application traffic to a service function chain order according to provisioned service chain policies.

Beneficially, embodiments of the disclosure allow the network operator to define and modify service function chaining policies for steering traffic on per application per UE basis through required service function chaining with ordered service functions to improve the user's Quality of Experience ("QoE").

Beneficially, embodiments of the disclosure allow the service function chaining to provide suitable means for authorized third parties to request a chain of service functions provided by the network operator based on operator's service function chaining policies.

FIG. 1 depicts a wireless communication system 100 for configuring N6-LAN chain policies, according to embodiments of the disclosure. In one embodiment, the wireless communication system 100 includes at least one remote unit 105, a radio access network ("RAN") 120, a mobile core network 130, a N6-LAN 140 and a Packet Data Network 150. The RAN 120 and the mobile core network 130 form a mobile communication network. The RAN 120 may be composed of a base unit 121 with which the remote unit 105 communicates using wireless communication links 123. Even though a specific number of remote units 105, base units 121, wireless communication links 123, RANs 120, mobile core networks 130, N6-LANs 140 and a Packet Data Networks 150 are depicted in FIG. 1, one of skill in the art will recognize that any number of remote units 105, base units 121, wireless communication links 123, RANs 120, mobile core networks 130, N6-LANs 140 and a Packet Data Networks 150 may be included in the wireless communication system 100.

In one implementation, the RAN 120 is compliant with the 5G system specified in the 3GPP specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130.

In some embodiments, the remote units 105 communicate with an application server via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server (e.g., the content server 151 in the packet data network 150) using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 150, e.g., representative of the Internet.

The remote unit 105 may establish additional PDU sessions for communicating with other data networks and/or other communication peers.

In the context of a 5G system ("5GS"), the term "PDU Session" a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a 5GC or an Evolved Packet Core ("EPC"), which may be coupled to a packet data network 150, like the Internet and private data networks, among other data networks. A remote unit 105 may have a subscription or other account with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Network Exposure Function ("NEF") 136, Policy Control Function ("PCF") 137, a Service Function Chain ("SFC") function 138, a Unified Data Management function ("UDM") and a User Data Repository ("UDR"). In some embodiments, the UDM is co-located with the UDR, depicted in FIG. 1 as combined entity "UDM/UDR" 139.

The UPF(s) 131 is responsible for packet routing and forwarding, packet inspection, QoS handling, and external PDU session for interconnecting Data Network (DN), in the 5G architecture. The AMF 133 is responsible for termination of NAS signaling, NAS ciphering & integrity protection, registration management, connection management, mobility management, access authentication and authorization, security context management. The SMF 135 is responsible for session management (i.e., session establishment, modification, release), remote unit (i.e., UE) IP address allocation & management, DL data notification, and traffic steering configuration for UPF for proper traffic routing.

The NEF 136 is responsible for making network data and resources easily accessible to customers and network partners. Service providers may activate new capabilities and expose them through APIs. These APIs allow third-party authorized applications to monitor and configure the network's behavior for a number of different subscribers (i.e., connected devices with different applications). The PCF 137 is responsible for unified policy framework, providing policy rules to CP functions, access subscription information for policy decisions in UDR.

The SFC function 138 is responsible for creating an N6-LAN chain policy. In some embodiments, the SFC function 138 allocates an N6-LAN policy chain identifier that is associated to the N6-LAN chain policy. The UDM 139 is responsible for generation of Authentication and Key Agreement ("AKA") credentials, user identification handling, access authorization, subscription management. The UDR 139 is a repository of subscriber information and can be used to service a number of network functions. For example, the UDR may store subscription data, policy-related data, subscriber-related data that is permitted to be exposed to third-party applications, and the like.

In various embodiments, the mobile core network 130 may also include an Authentication Server Function ("AUSF") (which acts as an authentication server), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a single-network slice selection assistance information ("S-NSSAI,") while a set of network slices for which the remote unit 105 is authorized to use is identified by network slice selection assistance information ("NSSAI").

Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed. Where different network slices are deployed, the mobile core network 140 may include a Network Slice Selection Function ("NSSF") which is responsible for selecting of the Network Slice instances to serve the remote unit 105, determining the allowed NSSAI, determining the AMF set to be used to serve the remote unit 105.

Although specific numbers and types of network functions are depicted in FIG. 1, one of skill in the art will recognize that any number and type of network functions may be included in the mobile core network 130. Moreover, in an LTE variant where the mobile core network 130 comprises an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

The N6-LAN network 140 is configured to route traffic via specific service functions and also via a specific order of service function. For example, some of the user traffic is routed within the N6-LAN network 140 where the traffic is sent first to a service function implementing Deep Packet Inspection followed by a Service Function implementing Content Control. This is illustrated in FIG. 1. Note that the N6-LAN 140 is separate from the mobile core network 130.

The N6-LAN comprises at least one service function that processes user-plane traffic. In the depicted embodiment, the N6-LAN network 140 includes at least three service function, denoted here as Service Function-1 141, Service Function-2 142, and Service Function-3 143. Here, the Service Function-1 141 provides Deep Packet Inspection ("DPI") services, Service Function-2 142 provides TCP window optimizer services, and Service Function-3 143 provides content filter and anti-malware services. In certain embodiments, only one of the service functions 141-143 will be enabled for certain user-plane traffic (i.e., associated with one or more remote units 105). In other embodiments, multiple of the service functions will be enabled for the user-plane traffic. Here, the enabled service function(s) and—where applicable—the order of processing will be specified in a service function chaining policy, also referred to as N6-LAN chain policy.

In various embodiments, service functions chaining policies are able to distinguish between upstream and downstream traffic. Moreover, the N6-LAN 140 may support coexistence of traffic with and without service function chaining. The service function chaining supports deployments where the Hosted Services are provided by the operator and deployments where the Hosted Services are provided by a third party.

In case of roaming, the home PLMN ("HPLMN") is able to apply traffic steering policies and service function chaining polices for home routed traffic. In case of roaming with local breakout, the HPLMN shall be able to provide the traffic steering policies and service function chaining policies to the visited PLMN ("VPLMN") providing local breakout with support of service function chaining.

The Operations, Administration and Maintenance ("OAM") 160 in involved with the operating, administering, managing and maintaining of the system 100. "Operations" encompass automatic monitoring of environment, detecting and determining faults and alerting admins. "Administration" involves collecting performance stats, accounting data for the purpose of billing, capacity planning using Usage data and maintaining system reliability. Administration can also involve maintaining the service databases which are used to determine periodic billing. "Maintenance" involves upgrades, fixes, new feature enablement, backup and restore and monitoring the media health. In certain embodiments, the OAM 160 may also be involved with provisioning, i.e., the setting up of the user accounts, devices and services.

The Application Function ("AF") 153 supports application influence on traffic routing, accessing NEF, interaction with policy framework for policy control. The AF 153 may be in the domain of an Application Service Provider ("ASP") which provides services to subscribers of the mobile core network 130.

While FIG. 1 depicts components of a 5G RAN and a 5G core network, the described embodiments for configuring N6-LAN chain policies apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the operations are described mainly in the context of NR. However, the proposed solutions/methods are also equally applicable to other mobile communication systems supporting configuring N6-LAN chain policies.

Currently, a network operator determines how user plane traffic is routed within an N6-LAN network based on pre-configured routing policies. Under current practice, when an ASP requires a specific N6-LAN configuration, the ASP is required to have a service level agreement ("SLA") agreement with the network operator (i.e., a documented agreement between the ASP and the network operator that identifies both the services required/provided, resource responsibilities, and the expected level of service), and the network operator pre-configures such routing policy in the network. In addition, current practice requires additional configuration in the network operator to indicate for which UEs such N6-LAN routing policy needs to apply.

To overcome these and other problems in current N6-LAN configuration procedure, embodiments of the disclosure allow an ASP to dynamically configure one or more N6-LAN chain policies within the network operator. In addition, embodiments of the disclosure allow the ASP to dynamically indicate how to route traffic of one or more UEs according to a configured N6-LAN chain policy in the network operator.

According to a first solution, the third-party ASP AF 153 interfaces with an OAM 160 within a network operator domain wherein the OAM is responsible for configuring service chain policies, for one or more N6-LAN networks (not shown in FIG. 2), hosted in the network operator domain. As used herein, a "service chain policy" denotes a selected N6-LAN network from a plurality of N6-LAN networks hosted by a network operator, as well as the service functions and order of service functions that application traffic should be routed via the selected N6-LAN network.

The AF 201 discovers what N6-LAN networks and the service functions are available by each N6-LAN network by the network operator and requests specific service function and the order of service functions also known as a chain of service function that application traffic should be routed. The OAM configures the service chain policies in the operator network and provides an N6-LAN chain policy ID to the AF, as described below with reference to FIG. 2. The third-party AF uses the N6-LAN chain policy ID to indicate for which traffic this N6-LAN chain policy should be used, as described below with reference to FIG. 5.

According to a second solution, the AF may provision service chain policies via an NEF. The NEF interfaces with a SFC function responsible to configure N6-LAN chain policies. The SFC function may be an OAM. The SFC function creates an N6-LAN chain policy and configures applicable UPFs and SMFs. The SFC function allocates an N6-LAN policy chain identifiers that is associated to the N6-LAN chain policy and provides the identifier to the NEF. The NEF provides the N6-LAN chain policy ID to the AF, as described below with reference to FIG. 3. The third-party AF uses the N6-LAN chain policy ID to indicate for which traffic this N6-LAN chain policy should be used, as described below with reference to FIG. 5.

According to a third solution, the AF may discover via the NEF the installed N6-LAN chain policies. When an ASP requires specific N6-LAN services for a UE or Group of UEs the ASP's AF discovers the available N6-LAN chain policies for a UE or group of UE in a specific area of interest or a DNN or a network slice. The AF invokes an Nnef service operations to discover the available N6-LAN chain policies. The request is received by the PCF. The PCF interacts with the UDR to obtain all available N6-LAN chain policies for the third-party ASP. The PCF then responds to the AF providing the available N6-LAN chain policies and a reference identifier for each policy, as described below with reference to FIG. 4.

According to a fourth solution, the AF configures and discovers available N6-LAN chain policies according to the procedures described below with reference to FIG. 2-4. The AF (of the ASP) then determines for which UEs and/or DNN and/or S-NSAAI and application traffic an N6-LAN chain policy should be enabled. The AF then indicates to the network how application traffic should be steered within the N6-LAN network based on configured N6-LAN chain policies as described in this section, as described below with reference to FIG. 5.

Figure 2:
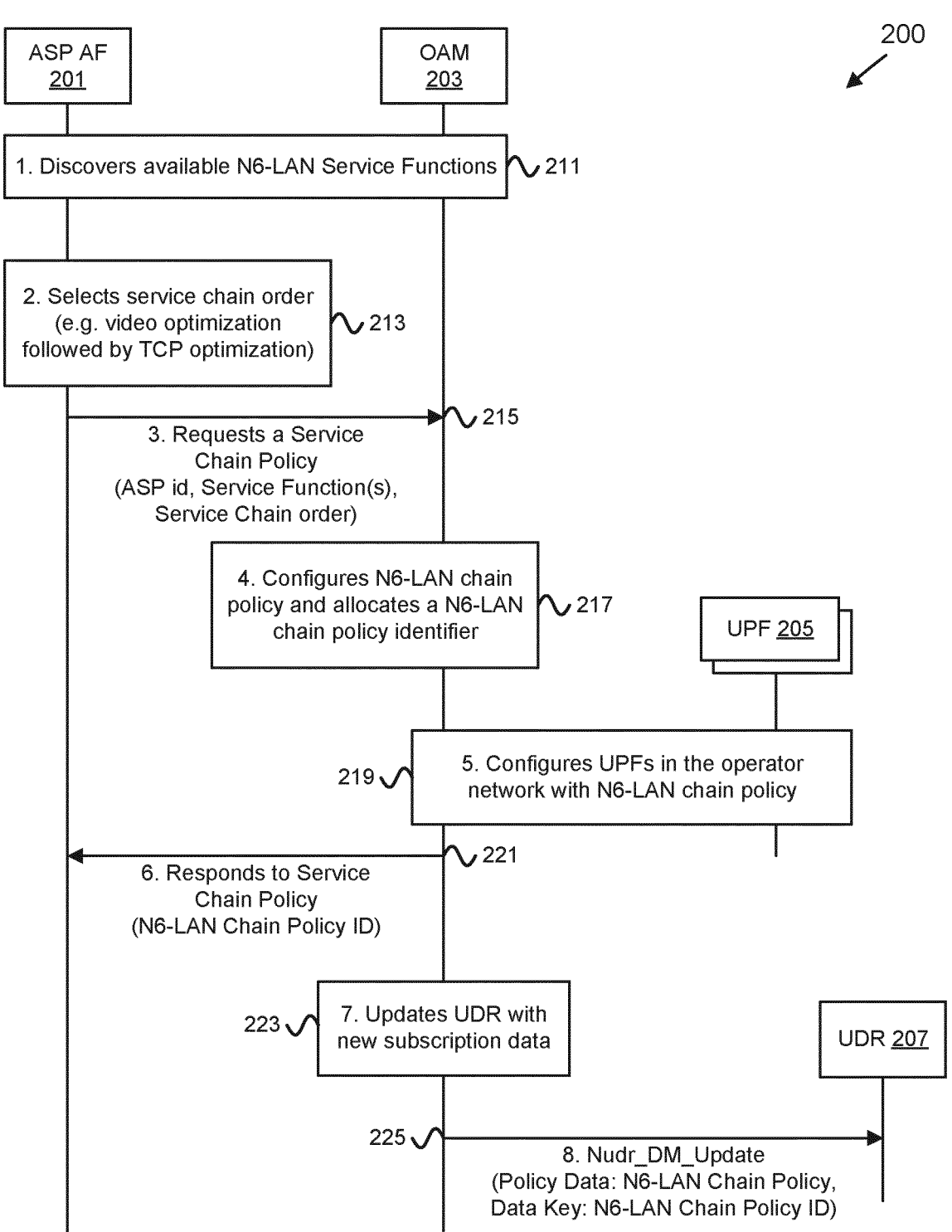
FIG. 2 is a diagram illustrating one embodiment of third-party AF provisioning N6-LAN chain policies.

FIG. 2 depicts a procedure for an ASP AF provisioning N6-LAN chain policies to a PLMN, according to embodiments of the first solution of the disclosure. As depicted, the procedure 200 involves a third party (i.e., not belonging to the PLMN) ASP AF 201, an OAM entity 203, one or more UPFs 205 in the 5GC and a UDR 207 in the 5GC. The ASP AF 201 may be one embodiment of the AF 153, the OAM entity 203 may be one embodiment of the OAM 160, the UPF(s) 205 may be embodiments of the UPF 131, and the UDR 207 may be one embodiment of the UDM/UDR 139.

The procedure 200 begins at Step 1 as the third-party AF 201 discovers available N6-LAN networks hosted by the network operator and service functions supported within each N6-LAN network by interfacing with the OAM entity 203 within the operator's network where the OAM supports configuration of N6-LAN chain policies within the operator's network (see block 211). Note that the N6-LANs are separate from the 5GC containing the UDR 207 and one or more UPFs 205.

At Step 2, the ASP AF 201 selects service functions and service function chain order (see block 213).

At Step 3, the ASP AF 201 indicates to the OAM entity 203 the selected N6-LAN network and the service functions and order of service function that is required (see messaging 215). The message from AF 201 also includes an ASP identifier identifying the application service provider.

At Step 4, the OAM entity 203 configures an N6-LAN chain policy and allocates an N6-LAN chain identifier ("ID") associated to the policy (see block 217).

At Step 5, the OAM entity 203 configures the UPFs 205 in the operator network with the newly created N6-LAN chain policy (see block 219). Additionally, the OAM entity 203 may also configure an SMF in the operator network with the N6-LAN chain policy (not shown in FIG. 2). The N6-LAN chain policy provides information to the UPFs 205 on the selected N6-LAN network and the service function and order of service function that traffic must be routed.

At Step 6, the OAM entity 203 provides the N6-LAN chain policy ID to the ASP AF 201 (see messaging 221).

At Step 7, the OAM entity 203 determines to update the subscription data in the UDR 207 with the new N6-LAN chain policy (see block 223).

At Step 8, the OAM entity 203 invokes an Nudr_DM_Update service operation including the new N6-LAN chain policy within the Policy Data of the UDR 207 (see messaging 225). The OAM entity 203 also includes in the N6-LAN chain policy ID as the Data Key identifier.

Figure 3:
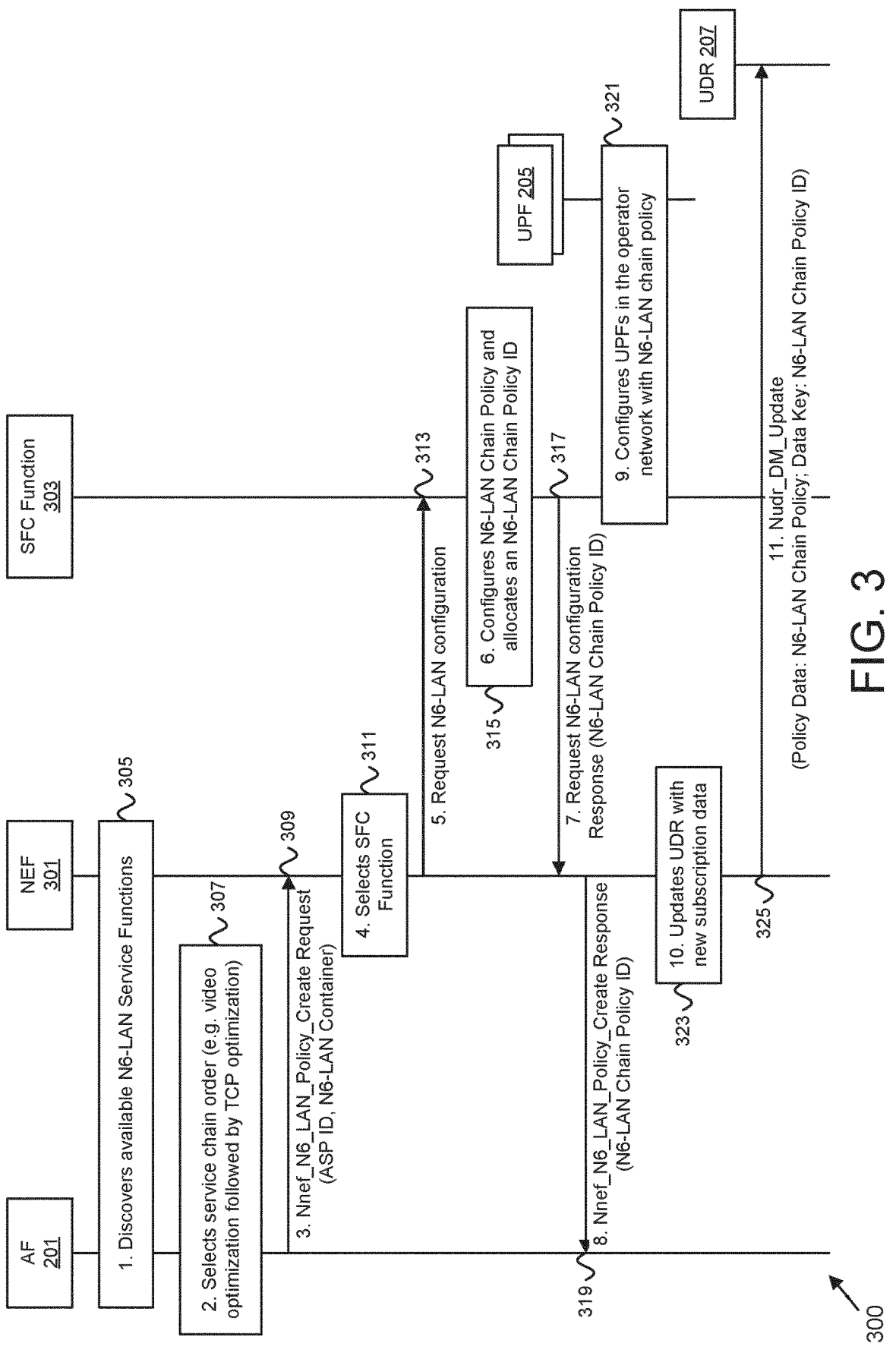
FIG. 3 is a diagram illustrating another embodiment of third-party AF provisioning N6-LAN chain policies.

FIG. 3 depicts a procedure 300 for third-party AF provisioning N6-LAN chain policies, according to embodiments of the first solution of the disclosure. As depicted, the procedure 300 involves the third-party ASP AF 201, an NEF 301, a SFC function 303, the one or more UPFs 205 in the 5GC and the UDR 207 in the 5GC. The ASP AF 201 may be one embodiment of the AF 153, the NEF 301 may be one embodiment of the NEF 136, the SFC function 303 may be one embodiment of the SFCF 138, the UPF(s) 205 may be embodiments of the UPF 131, and the UDR 207 may be one embodiment of the UDM/UDR 139.

The procedure 300 begins at Step 1 as the third-party ASP AF 201 discovers available N6-LAN networks hosted by the network operator and service functions supported within each N6-LAN network by interfacing with an NEF 301 within the operator's network (see block 305). This is carried out via a specific Nnef service based operation.

At Step 2, the ASP AF 201 selects N6-LAN network and service functions and service function chain order (see block 307). Note that the selected N6-LAN network is separate from the 5GC containing the UDR 207 and the one or more UPFs 205.

At Step 3, the ASP AF 201 indicates to the NEF 301 the selected N6-LAN network and service function(s) and order of service function—also known as chain of service functions—that is required. The AF 201 invokes an Nnef N6_LAN_Policy Create service operation including an ASP identifier identifying the application service provider and an N6-LAN container (see messaging 309). The N6-LAN container includes the ASPs preference for selected N6-LAN network and service functions and order of service function in the N6-LAN chain.

At Step 4, the NEF 301 authorizes that the ASP is allowed to request N6-LAN policies and selects an SFC function 303 (see block 311).

At Step 5, the NEF 301 requests N6-LAN configuration from the SFC function 303, e.g., using a service-based operation (see messaging 313). The N6-LAN container provided in step 3 is included in the request At Step 6, the SFC function 303 creates an N6-LAN chain policy and allocates an N6-LAN chain policy ID that is associated to the newly created N6-LAN chain policy (see block 315).

At Step 7, the SFC function 303 responds to the NEF 311 with the N6-LAN chain policy ID (see messaging 317).

At Step 8, the NEF 301 responds to the ASP AF 201 with the N6-LAN chain policy ID associated to the configured N6-LAN chain policy (see messaging 319).

At Step 9, the SFC function 303 configures the UPFs 205 in the operator network with the newly created N6-LAN chain policy (see block 321). Additionally, the SFC function 303 may also configure an SMF in the operator network with the N6-LAN chain policy (not shown in FIG. 3). The N6-LAN chain policy provides information to the UPFs 205 on the selected N6-LAN network and the service function and order of service function that traffic must be routed.

At Step 10, the NEF 301 determines to update the subscription data in the UDR 207 with the new N6-LAN chain policy (see block 323). In an alternative embodiment, the SFC function 303 may update the subscription data in the UDR 207 with the new N6-LAN chain policy.

At Step 11, the NEF 301 (alternatively, the SFC function 303) invokes an Nudr_DM_Update service operator including additional N6-LAN chain policy within an N6-LAN chain policy sub-dataset and an N6-LAN chain policy ID within the Policy Data of the UDR 207 (see messaging 325). The SFC function 303 also includes in the Data Key identifier the N6-LAN chain policy ID.

An example of N6-LAN chain policies stored in the UDR 207 is shown in Table 1. The N6-LAN chain policies may be stored to the UDR 207 by an OAM entity 203 (as depicted in FIG. 2) or, alternatively, by a SFC function 303 (as depicted in FIG. 3).

TABLE 1

| N6-LAN steering policies stored in the UDR per ASP | | | |
|---|---|---|---|
| Dataset | Sub-dataset | Data Key Identifier | |
| Policy Data | UE context policy control data | Subscription Permanent Identifier ("SUPI") | |
| | PDU Session policy control data | SUPI | S-NSSAI DNN |
| | Policy Set Entry data | SUPI (for the UDR in HPLMN) PLMN ID (for the UDR in VPLMN) | |
| | Remaining allowed Usage data | SUPI | S-NSSAI DNN |
| | Sponsored data connectivity profiles | Sponsor Identity | |
| | Background Data Transfer data | Background Data Transfer Reference ID. None. | |
| | N6-LAN Chain policy data (new) | N6-LAN Chain policy ID (new) | |

With reference to Table 1, the contents of the UE context policy control data, the PDU Session policy control data, the Policy Set Entry data, the Remaining allowed Usage data are described in 3GPP TS 23.503, clause 6.2.1.3. The contents of the Sponsored data connectivity profiles and Background Data Transfer data are described in 3GPP TS 23.503, clause 6.2.1.6.

The N6-LAN chain policies are stored within the Policy Data dataset of the UDR 207 under a new sub data set "N6-LAN chain policy data" with data key identifier the N6-LAN chain policy identifier of the policy. Each N6-LAN chain policy data includes a specific user plane traffic routing configuration within the N6-LAN and the order of service functions that the user plane traffic must traverse. The N6-LAN chain policy data within the UDR 207 contains the following information:

an ASP identifier,

Non-IP information or IP 3-tuple to identify the Application server, an N6-LAN chain policy together, an associated N6-LAN chain policy identifier, N6-LAN chain policy information which may include: selected N6-LAN network, Service Functions order of service chain functions and, validity conditions for the policy, i.e., applicable DNN, area of interest or S-NSSAI.

Figure 4:
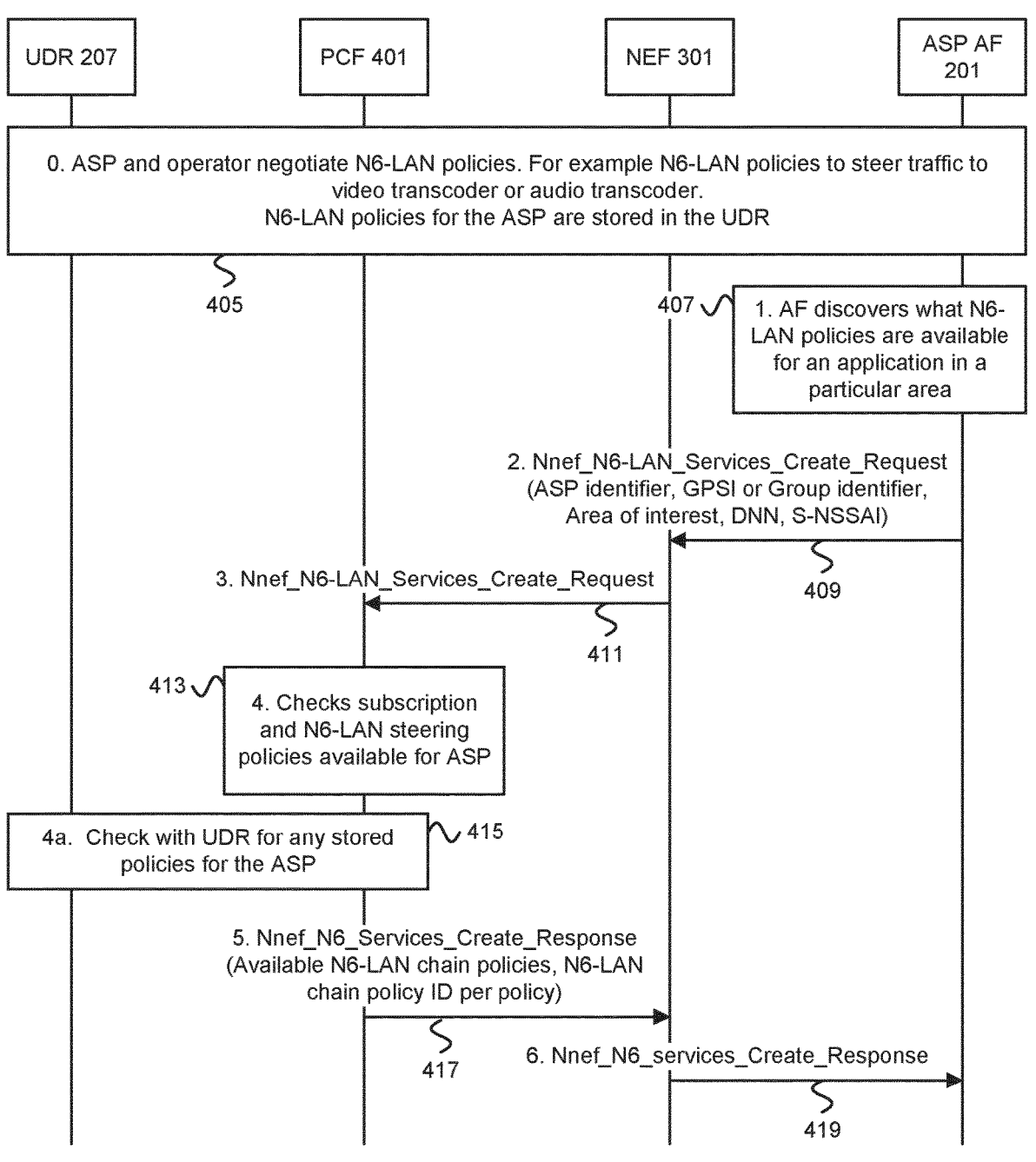
FIG. 4 is a diagram illustrating one embodiment of negotiation of N6-LAN chain policies.

FIG. 4 depict a procedure 400 for negotiation of N6-LAN chain policies, according to embodiments of the disclosure. The procedure 400 involves the UDR 207, a PCF 401, the NEF 301 and the ASP AF 201. The PCF 401 may be one embodiment of the PCF 137 described above.

The procedure 400 begins at Step 0, as the third-party ASP configures N6-LAN chain policies at a network operator (see block 405). These N6-LAN chain policies are stored in the UDR 207. Note that the N6-LAN chain policy configuration may be according to the procedures described above with reference to FIGS. 2-3.

At Step 1, the ASP AF 201 is triggered to enable or change N6-LAN chain policies for a UE or group of UEs (see block 407).

At Step 2, the ASP AF 201 sends to the NEF 301 of the 3GPP operator, an Nnef N6_Services_Create_Request request (see messaging 409) including an identifier of the ASP, external identifiers (GPSI) or a UE or Group of UE, Area of Interest, DNN and S-NSSAI At Step 3, the NEF 301 determines the SUPI of the UE(s) and forwards the request to the PCF 401 (see messaging 411).

At Step 4, the PCF 401 checks the subscription policy and retrieves the available N6-LAN chaining policies for the ASP.

At Step 4a, the PCF 401 requests from the UDR 207 the stored N6-LAN chain policies for all the ASPs using Nudr_DM_Query (Policy Data, N6-LAN chain policies) service operation (see block 415).

At Step 5, the PCF 401 determines the N6-LAN chain policies that are applicable for the ASP at the requested Area of interest, DNN or S-NSSAI (if provided in step 2). The PCF 401 includes the available N6-LAN chain policies to NEF within an Nnef N6_services_request_response (see step 417). The response includes a reference ID for each N6-LAN chain policy available for the ASP.

At Step 6, the NEF 301 forwards the response to the ASP AF 201 (see messaging 419).

Figure 5:
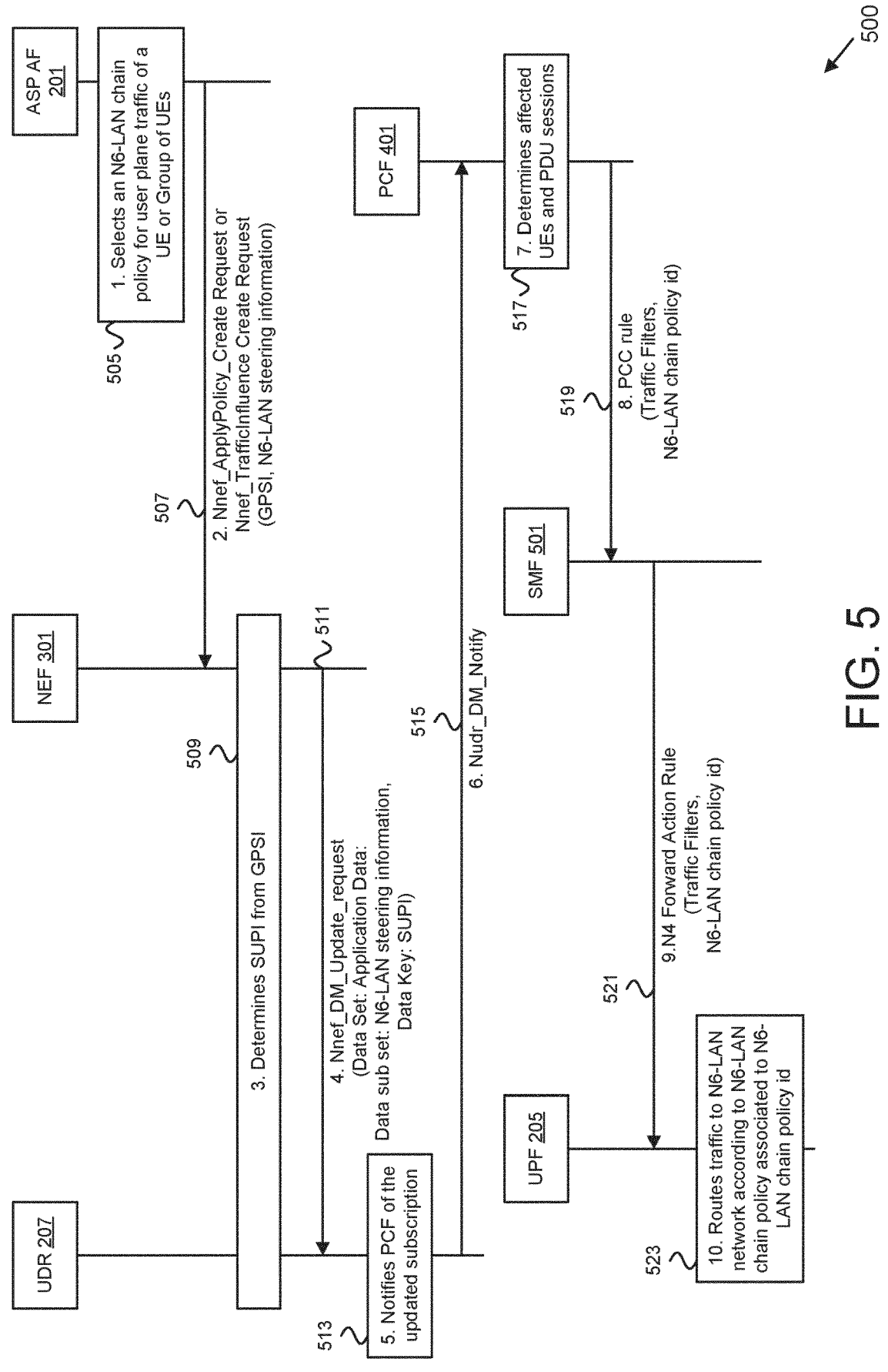
FIG. 5 is a diagram illustrating one embodiment of a procedure for AF requesting to enable an N6-LAN chain policy for a UE.

FIG. 5 depicts a procedure 500 for AF requesting to enable an N6-LAN chain policy for a UE, according to embodiments of the fourth solution of the disclosure. The procedure 500 involves the ASP AF 201, the NEF 301, the UDR 207, the PCF 401, a SMF 501, and the UPF 205. The SMF 501 may be one embodiment of the SMF 135 described above.

The procedure for an AF to inform the 5G core network on the N6-LAN chain policy that should be used for specific UE(s) and application traffic is as follows:

The AF sends a first request (e.g., a traffic influence request), e.g., by invoking an Nnef_TrafficInfluence_Create or an Nnef_ApplyPolicy create request service operation or a new service operation to an NEF that includes the UE ID or Group ID of the affected UEs or DNN or S-NSSAI and N6-LAN steering information. If DNN is included the policy is applicable for all UEs that have established a PDU session at this DNN. If S-NSSAI is included the policy is applicable for all UEs that have user plane connections at this S-NSSAI. The N6-LAN steering information may be included in a container.

The N6-LAN steering information indicates a chain of one or more service functions in the N6-LAN that must process the user-plane traffic associated with the specific UE(s). The N6-LAN steering information includes:

Application ID or Traffic Filters of the affected application

N6-LAN chain policy identifier of the selected N6-LAN chain policy.

The NEF determines the internal identifier of the UE(s) (i.e., SUPI) and update the subscription in the UDR by invoking an Nnef_DM_Update request service operation. The NEF updates the subscription data in the UDR by including within the Application Data dataset, under a sub-dataset, new N6-LAN steering information and also includes as data key the identifier(s) of the affected UE(s) (SUPI) or DNN or S-NSSAI.

The N6-LAN steering information includes the Application ID or Traffic Filters of the user plane traffic that needs to be routed towards the N6-LAN. An example is shown in Table 2.

TABLE 2

N6-LAN steering information stored in the Application Data dataset of the UDR

| Dataset | Sub-dataset | Data Key Identifier |
|---|---|---|
| Application data | Packet Flow Descriptions (PFDs) | Application ID |
| | AF traffic influence request information | AF transaction internal ID S-NSSAI and DNN and/or Internal Group Identifier or SUPI |
| | Background Data Transfer | Internal Group Identifier or SUPI (NOTE 3) |
| | Service specific information | S-NSSAI and DNN or Internal Group Identifier or SUPI |
| | N6-LAN steering information | SUPI or DNN or S-NSSAI |

With reference to Table 2, the contents of the AF traffic influence request information are described in 3GPP TS 23.503, clauses 5.6.7 and clause 6.3.7.2. The contents of the Service specific information are described in 3GPP TS 23.503, clause 4.15.6.7.

The UDR 207 notifies the PCF 401 of the updated subscription information. The PCF 401 determines the affected UEs, PDU sessions and application traffic and determines new or updated PCC rules where the PCC rule includes traffic descriptors of the traffic that needs to be routed to the N6-LAN network and the N6-LAN chain policy ID of the associated N6-LAN chain policy. Here, the N6-LAN network is separate from the 5GC containing the UDR 207, NEF 301, the PCF 401, the SMF 501, and the UPF 205.

The PCF 401 then provides updated PCC rules to the SMF 501. The SMF configures the UPF with the N6-LAN chain policy ID. The UPF selects an N6-LAN network and routes traffic corresponding to the traffic filters to the service functions of the selected N6-LAN network in the order of service function according to the N6-LAN configuration associated to the N6-LAN chain policy identifier.

The procedure 500 begins at Step 1, as the AF 201 selects the N6-LAN chain policy (or policies) that should be enabled for a UE or Group of UE for one or more application traffic run by these UEs (see block 505). How the AF 201 determines the N6-LAN chain policies to be enabled is up to ASP implementation.

At Step 2, the AF 201 invokes an Nnef_TrafficInfluence Create or Nnef_ApplyPolicy Create or a new service operation including in the request the external identifier (i.e., GPSI) of the UE (or Group of UEs) and in a container N6-LAN steering information (see messaging 507). Here, the N6-LAN steering information container includes: an application ID or traffic filters of the application that traffic needs to be routed in the N6-LAN network and N6-LAN chain policy identifier of the N6-LAN chain policy that should be enabled. Note that the N6-LAN steering information may indicate a service function or a chain of service functions in the N6-LAN that must process the user-plane traffic associated with the identified UE (or Group of UEs).

At Step 3, the NEF 301 determines the SUPI of the UE from a Generic Public Subscription Identifier ("GPSI") (e.g., translates the GPSI into a permanent subscription identifier) by interfacing with the UDM 207 (see block 509). The NEF 301 may also determine if the ASP is authorized to use the N6-LAN chain policy by checking the N6-LAN Chain policy data within the Policy Data of the UDR 207.

At Step 4, the NEF 301 sends a second request to update the subscription data in the UDR 207, e.g., by invoking an Nudr_DM_Update service operation including N6-LAN steering information as a data subset under the Application Data Set and adding the SUPI of the affected UEs as a Data Key (see messaging 511).

At Step 5, the UDR 207 determines to notify the PCF(s) 401 that have subscribed to be notified of the changes in the subscription profile (see block 513).

At Step 6, the UDR 207 invokes an Nudr_DM_Notify service operation including the updated subscription information (see messaging 515).

At Step 7, the PCF 401 determines the affected UEs, traffic and PDU sessions where the N6-LAN chain policy needs to be included/updated (see block 517).

At Step 8, the PCF 401 provides updated PCC rules including the N6-LAN chain policy ID to the SMF 501 (see messaging 519).

At Step 9, the SMF 501 configures the UPF 205 according to the PCC rules. The SMF 501 sends over N4 a Forward Action Rule request including in the request traffic filters and the N6-LAN chain policy identifier (see messaging 521).

At Step 10, the UPF 205 selects an N6-LAN network and routes traffic corresponding to the traffic filters to the service functions of the selected N6-LAN network in the order of service functions according to the N6-LAN configuration associated to the N6-LAN chain policy identifier (see block 523).

Figure 6:
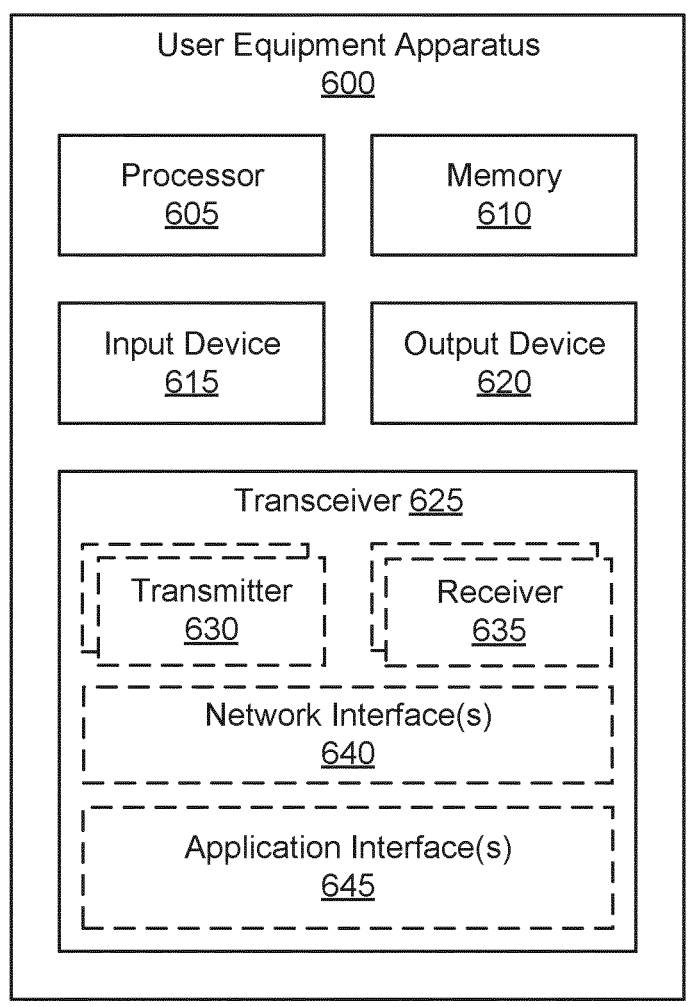
FIG. 6 is a diagram illustrating one embodiment of a user equipment apparatus that may be used for configuring N6-LAN chain policies.

FIG. 6 depicts a user equipment apparatus 600 that may be used for configuring N6-LAN chain policies, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more cells supported by one or more base units 121. Additionally, the transceiver 625 may support at least one network interface 640 and/or application interface 645. The network interface(s) 640 may support 3GPP reference points, such as Uu, N1, etc. The application interface(s) 645 may support one or more APIs. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In various embodiments, the processor 605 controls the user equipment apparatus 600 to implement the above described UE behaviors.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to configuring N6-LAN chain policies. For example, the memory 610 may store various parameters, configurations, resource assignments, policies, and the like as described above. In certain embodiments, the memory 610 also stores program code and related data, such as an operating system or other controller algorithms operating on the user equipment apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615. The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
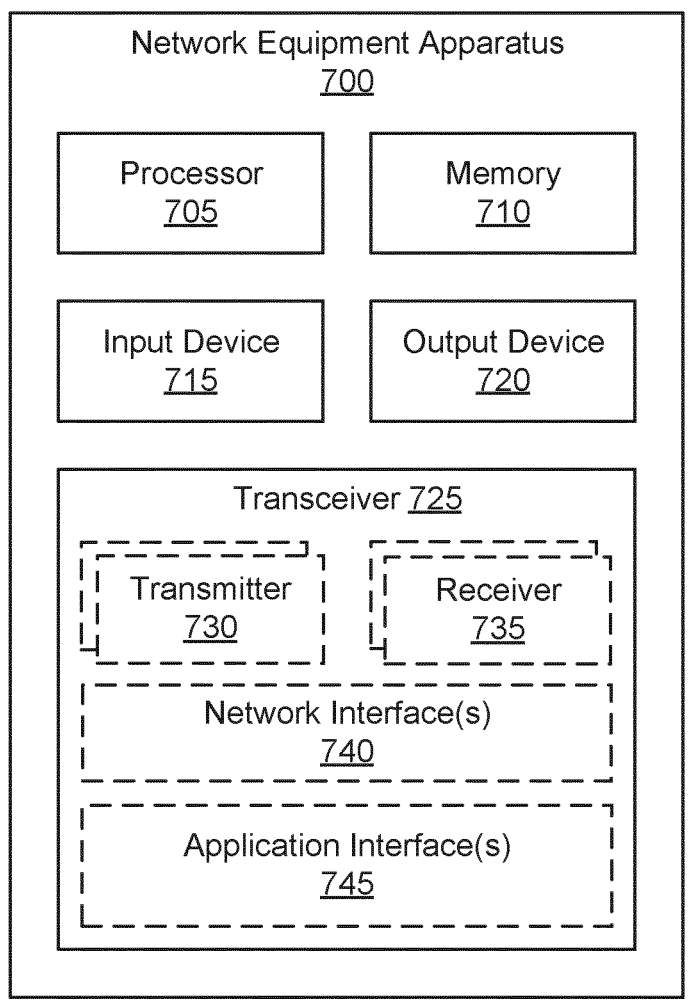
FIG. 7 is a diagram illustrating one embodiment of a network apparatus that may be used for configuring N6-LAN chain policies.

FIG. 7 depicts a network apparatus 700 that may be used for configuring N6-LAN chain policies, according to embodiments of the disclosure. The network apparatus 700 may be one embodiment of the ASP AF 201, the OAM entity 203, the UPF 205, the UDR 207, the NEF 301, the SFC function 303, the PCF 401, and/or the SMF 501, described above.

Furthermore, the base network apparatus 700 may include a processor 705, a memory 710, an input device 715, an output device 720, and a transceiver 725. In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as N3, N5, N6, and/or N7. Other network interfaces 740 may be supported, as understood by one of ordinary skill in the art.

When implementing an NEF, the network interface(s) 740 may include an interface for communicating with an application function (i.e., N5) and with at least one network function (e.g., UDR, SFC function, UPF) in a mobile communication network, such as the mobile core network 130. When implementing a PCF, the network interface(s) 740 may include a network interface that communicates with at least one network function (e.g., UDR, SMF) in the mobile communication network. When implementing an AF, the network interface(s) 740 may include a network interface that communicates with at least one network function (e.g., NEF) in the mobile communication network. In the above scenarios, the mobile communication network comprises a mobile core network (e.g., 5GC) and an N6-LAN (e.g., separate from the mobile core network), where the N6-LAN comprises at least one service function that processes user-plane traffic.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network apparatus 700 operates as an NEF. In such embodiments, the processor 705 receives (e.g., via the network interface 740) a first request from an AF (e.g., a traffic influence request), the first request containing an external identifier (e.g., a GPSI) for at least one UE and N6-LAN steering information indicating a service function or a chain of service functions in the N6-LAN that must process the user-plane traffic associated with the at least one UE. The processor 705 translates the external identifier into a permanent subscription identifier of the at least one UE and sends (e.g., via the network interface) a second request (e.g., an update request) to a first network function (e.g., a UDR) to update an application data set to include the N6-LAN steering information and the permanent subscription identifier. Here, the application data set may be further applied to identify the user-plane traffic associated with the at least one UE and to cause (i.e., enforce) this user-plane traffic to traverse the chain of service functions in the N6-LAN.

In some embodiments, the N6-LAN steering information contains policy for routing user plane traffic to an N6-LAN network. In certain embodiments, the N6-LAN steering information contains at least one of: A) an application identifier of an application having traffic to be routed in the N6-LAN network; B) a traffic filter of the application having traffic to be routed in the N6-LAN network; and C) a policy identifier of an N6-LAN chain policy that is to be enabled. In certain embodiments, the processor 705 further determines whether a service provider associated with the first request is authorized to use the N6-LAN chain policy (e.g., by checking the N6-LAN Chain policy data within the Policy Data of the UDR).

In some embodiments, the first network function is a UDR that stores the application data set. In such embodiments, the second request invokes an Nudr_DM_Update service operation to add N6-LAN steering information as a data subset under the application data set and to add the permanent subscription identifier as a data key of the application data set.

In some embodiments, the processor 705 further receives a service chain request from the AF and determines whether the AF is authorized to make the service chain request. In such embodiments, the processor 705 sends a configuration request to a second network function (e.g., SFC function) and receives a configuration response containing a policy identifier for at least one N6-LAN chain policy. The processor 705 further forwards the policy identifier to the AF and updates the first network function with the policy identifier and the at least one N6-LAN chain policy.

In various embodiments, the network apparatus 700 operates as a PCF. In such embodiments, the processor 705 receives (via the network interface 740) an update notification from a first network function. Here, the update notification contains N6-LAN steering information for one or more subscription identifiers. The processor 705 identifies at least one UE having a data connection affected by the N6-LAN steering information and generates at least one policy rule for the at least one UE based on the N6-LAN steering information. Via the network interface 740, the processor 705 sends the at least one policy rule to a second network function (e.g., SMF) for configuring a user plane route of the affected data connection.

In some embodiments, the N6-LAN steering information containing policy for routing traffic to an N6-LAN network containing at least one of: A) an application identifier of an application having traffic to be routed in the N6-LAN network; B) a traffic filter of the application having traffic to be routed in the N6-LAN network; and C) a policy identifier of an N6-LAN chain policy that is to be enabled. In some embodiments, the first network function is a UDR that stores the application data set, wherein the update notification invokes an Nudr_DM_Notify service operation to notify of updated N6-LAN steering information. In various embodiments, the N6-LAN steering information indicates a service function or a chain of service functions in the N6-LAN that must process the user-plane traffic associated with the at least one UE.

In various embodiments, the network apparatus 700 operates as an AF. In such embodiments, via the network interface 740, the processor 705 sends a discovery request to a first network function (e.g., a NEF or OAM entity) and receives a discovery response from the network, the discovery response containing at least one available N6-LAN chain policy and a policy identifier for each available N6-LAN chain policy. The processor 705 selects first traffic that is to be routed to a selected N6-LAN network based on a selected N6-LAN chain policy, the first traffic associated with one of: a DNN, a network slice, and a user that is to be routed to the selected N6-LAN network. Via the network interface 740, the processor 705 sends a first request (e.g., traffic influence request) to a network exposure function (e.g., the NEF), the first request containing an external identifier (e.g., GPSI) for at least one UE and N6-LAN steering information indicating a service function or a chain of service functions in the N6-LAN that must process the user-plane traffic associated with the at least one UE.

In some embodiments, the discovery request contains at least one of: A) a service provider identifier; B) at least one second external identifier; C) an area of interest; D) a data network name; and E) a network slice identifier. In certain embodiments, the processor further translates the at least one second external identifier into at least one second permanent subscription identifier. Here, the forwarded discovery request contains the at least one second permanent subscription identifier, where the at least one available N6-LAN chain policy is identified using the at least one second permanent subscription identifier.

In some embodiments, the N6-LAN steering information includes at least one of: A) an application identifier of an application having traffic to be routed in the selected N6-LAN network; B) a traffic filter of the application having traffic to be routed in the selected N6-LAN network; and C) a policy identifier of an N6-LAN chain policy that is to be enabled.

In some embodiments, the processor discovers a plurality of available N6-LAN networks and service functions within each N6-LAN network and selects at least one N6-LAN network and at least one available service function and a service function chain order for the selected at least one service function within the selected N6-LAN network. In such embodiments, the processor further sends a service chain request to the first network function (e.g., the NEF or OAM) for configuring a N6-LAN chain policy corresponding to the selected N6-LAN network and at least one service function and the service function chain order within the selected N6-LAN network and receives a policy identifier for at least one N6-LAN chain policy from the first network function. In one embodiment, the first network function and the network exposure function are the same network function. In another embodiment, the first network function is an OAM entity separate from the network exposure function.

In various embodiments, the network apparatus 700 operates as an OAM entity. In such embodiments, via the network interface, the processor 705 receives a service chain policy request from an AF. The processor 705 configures at least one new N6-LAN chain policy and allocates a N6-LAN chain policy identifier for each new N6-LAN chain policy. The processor 705 configures at least one first network function (e.g., UPF) with the policy identifier and configuration information to steer user plane traffic to a selected N6-LAN network and service function chain order according to the received service chain policy request. Via the network interface 740, the processor 705 sends a service chain policy response to the AF, the service chain policy response containing a policy identifier for at least one N6-LAN chain policy. The processor 705 updates a second network function (e.g., UDR) with the policy identifier and the at least one new N6-LAN chain policy.

In some embodiments, the second network function includes a Unified Data Repository ("UDR") storing the application data set. In such embodiments, updating the UDR may include invoking an Nudr_DM_Update service operation to add the new N6-LAN chain policy within the Policy Data of the UDR and to add the N6-LAN chain policy identifier as a Data Key of the new N6-LAN chain policy.

In some embodiments, the processor 705 receives a discovery request from the AF and sends a discovery response from the network, the discovery response containing at least one available N6-LAN chain policy and a policy identifier for each available N6-LAN chain policy, where the service chain policy request is received after sending the discovery response.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to configuring N6-LAN chain policies. For example, the memory 710 may store parameters, configurations, resource assignments, policies, N6-LAN steering information, N6-LAN chain policies, N6-LAN chain policy identifiers, UE identifiers (i.e., GPSI, SUPI) and the like, as described above. In certain embodiments, the memory 710 also stores program code and related data, such as an operating system or other controller algorithms operating on the network apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the PLMN and/or RAN, as described herein. Although only one transmitter 730 and one receiver 735 are illustrated, the network apparatus 700 may have any suitable number of transmitters 730 and receivers 735. Further, the transmitter(s) 725 and the receiver(s) 730 may be any suitable type of transmitters and receivers.

FIG. 8 depicts a method 800 for configuring N6-LAN chain policies, according to embodiments of the disclosure. In some embodiments, the method 800 is performed by a network exposure device in a mobile communication network, such as the NEF 136, the NEF 301, and/or the network apparatus 700. Here, the network exposure device is a core network function in a mobile communication network that comprises a mobile core network and an N6-LAN (e.g., separate from the mobile core network), where the N6-LAN comprises at least one service function that processes user-plane traffic. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a first request from an AF, the first request comprising an external identifier (e.g., GPSI) for at least one UE and N6-LAN steering information indicating a service function or a chain of service functions in the N6-LAN that must process the user-plane traffic associated with the at least one UE. The method 800 includes translating 810 the external identifier into a permanent subscription identifier of the at least one UE.

The method 800 includes sending 815 a second request to a first network function (e.g., a UDR) to update an application data set to include the N6-LAN steering information and the permanent subscription identifier. Here, the application data set may be applied to identify the user-plane traffic associated with the at least one UE and cause the identified user-plane traffic to traverse the chain of service functions in the N6-LAN. The method 800 ends.

FIG. 9 depicts a method 900 for configuring N6-LAN chain policies, according to embodiments of the disclosure. In some embodiments, the method 900 is performed by a policy control device, such as the PCF 137, the PCF 401, and/or the network apparatus 700. Here, the policy control device is a core network function in a mobile communication network that comprises a mobile core network and an N6-LAN (e.g., separate from the mobile core network), where the N6-LAN comprises at least one service function that processes user-plane traffic. In certain embodiments, the method 900 may be performed by a processor executing program code, for example, a microcontroller, a microprocessor, a CPU, a GPU, an auxiliary processing unit, a FPGA, or the like.

The method 900 begins and receives 905 update notification from a first network function (e.g., an Nudr_DM_Notify service operation from a UDR), the update notification containing N6-LAN steering information for one or more subscription identifiers. The method 900 includes identifying 910 at least one UE having a data connection affected by the N6-LAN steering information.

The method 900 includes generating 915 at least one policy rule for the at least one UE based on the N6-LAN steering information. The method 900 includes sending 920 the at least one policy rule to a second network function (e.g., SMF) for configuring a user plane route of the affected data connection. The method 900 ends.

FIG. 10 depicts a method 1000 for configuring N6-LAN chain policies, according to embodiments of the disclosure. In some embodiments, the method 1000 is performed by an application function ("AF"), such as the AF 153, the ASP AF 201, and/or the network apparatus 700. In certain embodiments, the method 1000 may be performed by a processor executing program code, for example, a microcontroller, a microprocessor, a CPU, a GPU, an auxiliary processing unit, a FPGA, or the like.

The method 1000 begins and sends 1005 a discovery request to a first network function (e.g., a NEF). The method 1000 includes receiving 1010 a discovery response from the network, the discovery response containing at least one available N6-LAN chain policy and a policy identifier for each available N6-LAN chain policy.

The method 1000 includes selecting 1015 first traffic that is to be routed to a selected N6-LAN network based on a selected N6-LAN chain policy, the first traffic associated with one of: a DNN, a network slice, and a user that is to be routed to the selected N6-LAN network. Here, the selected N6-LAN comprises at least one service function that processes user-plane traffic.

The method 1000 includes sending 1020 a first request to a network exposure function (e.g., the NEF), the first request containing an external identifier (e.g., GPSI) for at least one UE and N6-LAN steering information indicating a service function or a chain of service functions in the N6-LAN that must process the user-plane traffic associated with the at least one UE. The method 1000 ends.

Disclosed herein is a first apparatus for configuring N6-LAN chain policies, according to embodiments of the disclosure. The first apparatus may be implemented by a network exposure device, such as the NEF 136, the NEF 301, and/or the network apparatus 700. The first apparatus includes a network interface that communicates with an application function (i.e., N5) and at least one network function in a mobile communication network. Here, the network exposure device is a core network function in a mobile communication network that comprises a mobile core network and an N6-LAN (e.g., separate from the mobile core network), where the N6-LAN comprises at least one service function that processes user-plane traffic. The first apparatus includes a processor that receives (e.g., via the network interface) a first request from an AF, the first request containing an external identifier (e.g., a GPSI) for at least one UE and N6-LAN steering information indicating a chain of at least one service function in the N6-LAN that is to process the user-plane traffic associated with the at least one UE. The processor translates the external identifier into a permanent subscription identifier of the at least one UE and sends (e.g., via the network interface) a second request to a first network function (e.g., a UDR) to update an application data set to include the N6-LAN steering information and the permanent subscription identifier. Here, the application data set may be further applied to identify the user-plane traffic associated with the at least one UE and cause the identified user-plane traffic to traverse the chain of service functions in the N6-LAN.

In some embodiments, the N6-LAN steering information contains policy for routing user plane traffic to an N6-LAN network. In certain embodiments, the N6-LAN steering information contains at least one of: A) an application identifier of an application having traffic to be routed in the N6-LAN network; B) a traffic filter of the application having traffic to be routed in the N6-LAN network; and C) a policy identifier of an N6-LAN chain policy that is to be enabled. In certain embodiments, the processor further determines whether a service provider associated with the first request is authorized to use the N6-LAN chain policy (e.g., by checking the N6-LAN Chain policy data within the Policy Data of the UDR).

In some embodiments, the first network function is a UDR that stores the application data set. In such embodiments, the second request invokes an Nudr_DM_Update service operation to add N6-LAN steering information as a data subset under the application data set and to add the permanent subscription identifier as a data key of the application data set.

In some embodiments, the processor further receives a service chain request from the AF and determines whether the AF is authorized to make the service chain request. In such embodiments, the processor sends a configuration request to a second network function (e.g., SFC function) and receives a configuration response containing a policy identifier for at least one N6-LAN chain policy. The processor further forwards the policy identifier to the AF and updates the first network function with the policy identifier and the at least one N6-LAN chain policy.

In certain embodiments, the second network function (e.g., SFC function) configures at least one third network function (e.g., UPF) with the policy identifier and configuration information to steer user plane traffic to a selected N6-LAN network and service function chain order according to the received configuration request.

Disclosed herein is a first method for configuring N6-LAN chain policies. The first method may be performed by a network exposure device, such as the NEF 136, the NEF 301, and/or the network apparatus 700. Here, the network exposure device is a core network function in a mobile communication network that comprises a mobile core network and an N6-LAN (e.g., separate from the mobile core network), where the N6-LAN comprises at least one service function that processes user-plane traffic. The first method includes receiving a first request from an AF, the first request containing an external identifier (e.g., GPSI) for at least one UE and N6-LAN steering information indicating a chain of at least one service function in the N6-LAN that is to process the user-plane traffic associated with the at least one UE. The first method includes translating the external identifier into a permanent subscription identifier of the at least one UE and sending a second request to a first network function (e.g., UDR) to update an application data set to include the N6-LAN steering information and the permanent subscription identifier. Here, the application data set may be further applied to identify the user-plane traffic associated with the at least one UE and cause the identified user-plane traffic to traverse the chain of service functions in the N6-LAN.

In some embodiments, the N6-LAN steering information includes policy for routing user plane traffic to an N6-LAN network, the N6-LAN steering information containing at least one of: A) an application identifier of an application having traffic to be routed in the N6-LAN network; B) a traffic filter of the application having traffic to be routed in the N6-LAN network; and C) a policy identifier of an N6-LAN chain policy that is to be enabled. In certain embodiments, the first method further includes determining whether a service provider associated with the first request is authorized to use the N6-LAN chain policy (e.g., by checking the N6-LAN Chain policy data within the Policy Data of the UDR).

In some embodiments, the first network function is a UDR that stores the application data set. In such embodiments, the second request invokes an Nudr_DM_Update service operation to add N6-LAN steering information as a data subset under the application data set and to add the permanent subscription identifier as a data key of the application data set.

In some embodiments, the first method further includes: receiving a service chain request from the AF; determining whether the AF is authorized to make the service chain request; sending a configuration request to a second network function (e.g., SFC function); receiving a configuration response containing a policy identifier for at least one N6-LAN chain policy; forwarding the policy identifier to the AF; and updating the first network function with the policy identifier and the at least one N6-LAN chain policy.

In certain embodiments, the second network function (e.g., SFC function) configures at least one third network function (e.g., UPF) with the policy identifier and configuration information to steer user plane traffic to a selected N6-LAN network and service function chain order according to the received configuration request.

Disclosed herein is a second apparatus for configuring N6-LAN chain policies, according to embodiments of the disclosure. The second apparatus may be implemented by a policy control device, such as the PCF 137, the PCF 401, and/or the network apparatus 700. The second apparatus includes a processor and a network interface that communicates with at least one network function in a mobile communication network. The processor receives an update notification (e.g., an Nudr_DM_Notify service operation) from a first network function (e.g., UDR), the update notification containing N6-LAN steering information for one or more subscription identifiers. The processor identifies at least one UE having a data connection affected by the N6-LAN steering information and generates at least one policy rule for the at least one UE based on the N6-LAN steering information. Via the network interface, the processor sends the at least one policy rule to a second network function (e.g., SMF) for configuring a user plane route of the affected data connection.

In some embodiments, the N6-LAN steering information containing policy for routing traffic to an N6-LAN network containing at least one of: A) an application identifier of an application having traffic to be routed in the N6-LAN network; B) a traffic filter of the application having traffic to be routed in the N6-LAN network; and C) a policy identifier of an N6-LAN chain policy that is to be enabled. In certain embodiments, the N6-LAN steering information indicates a chain of at least one service function in the N6-LAN that is to process the user-plane traffic associated with the at least one UE.

In some embodiments, the first network function is a UDR that stores the application data set, wherein the update notification invokes an Nudr_DM_Notify service operation to notify of updated N6-LAN steering information. In some embodiments, the second network function (e.g., SMF) configures routing policies to a third network function (e.g., UPF) including the policy identifier of an N6-LAN chain policy that is to be enabled.

Disclosed herein is a second method for configuring N6-LAN chain policies, according to embodiments of the disclosure. The second method may be performed by a policy control device, such as the PCF 137, the PCF 401, and/or the network apparatus 700. The second method includes receiving an update notification (e.g., an Nudr_DM_Notify service operation) from a first network function (e.g., UDR), the update notification containing N6-LAN steering information for one or more subscription identifiers. The second method includes identifying at least one UE having a data connection affected by the N6-LAN steering information and generating at least one policy rule for the at least one UE based on the N6-LAN steering information. The second method includes sending the at least one policy rule to a second network function (e.g., SMF) for configuring a user plane route of the affected data connection.

In some embodiments, the N6-LAN steering information containing policy for routing traffic to an N6-LAN network containing at least one of: A) an application identifier of an application having traffic to be routed in the N6-LAN network; B) a traffic filter of the application having traffic to be routed in the N6-LAN network; and C) a policy identifier of an N6-LAN chain policy that is to be enabled. In certain embodiments, the N6-LAN steering information indicates a chain of at least one service function in the N6-LAN that is to process the user-plane traffic associated with the at least one UE.

In some embodiments, the first network function is a UDR that stores the application data set, wherein the update notification invokes an Nudr_DM_Notify service operation to notify of updated N6-LAN steering information. In some embodiments, the second network function (e.g., SMF) configures routing policies to a third network function (e.g., UPF) including the policy identifier of an N6-LAN chain policy that is to be enabled.

Disclosed herein is a third apparatus for configuring N6-LAN chain policies, according to embodiments of the disclosure. The third apparatus may be implemented by an application function ("AF"), such as the AF 153, the ASP AF 201, and/or the network apparatus 700. The third apparatus includes a processor and a network interface that communicates with at least one network function in a mobile communication network. Via the network interface, the processor sends a discovery request to a first network function (e.g., a NEF or OAM entity) and receives a discovery response from the network, the discovery response containing at least one available N6-LAN chain policy and a policy identifier for each available N6-LAN chain policy. The processor selects first traffic that is to be routed to a selected N6-LAN network based on a selected N6-LAN chain policy, the first traffic associated with one of: a DNN, a network slice, and a user that is to be routed to the selected N6-LAN network and sends a first request to a network exposure function (e.g., the NEF), the first request containing an external identifier (e.g., GPSI) for at least one UE and N6-LAN steering information indicating a chain of at least one service function in the N6-LAN that must process the user-plane traffic associated with the at least one UE.

In some embodiments, the discovery request contains at least one of: A) a service provider identifier; B) at least one second external identifier; C) an area of interest; D) a data network name; and E) a network slice identifier. In certain embodiments, the processor further translates the at least one second external identifier into at least one second permanent subscription identifier. Here, the forwarded discovery request contains the at least one second permanent subscription identifier, where the at least one available N6-LAN chain policy is identified using the at least one second permanent subscription identifier.

In some embodiments, the N6-LAN steering information includes at least one of: A) an application identifier of an application having traffic to be routed in the selected N6-LAN network; B) a traffic filter of the application having traffic to be routed in the selected N6-LAN network; and C) a policy identifier of an N6-LAN chain policy that is to be enabled.

In some embodiments, the processor discovers a plurality of available N6-LAN networks and service functions within each N6-LAN network and selects at least one N6-LAN network and at least one available service function and a service function chain order for the selected at least one service function within the selected N6-LAN network. In such embodiments, the processor further sends a service chain request to the first network function (e.g., the NEF) for configuring a N6-LAN chain policy corresponding to the selected N6-LAN network and at least one service function and the service function chain order within the selected N6-LAN network and receives a policy identifier for at least one N6-LAN chain policy from the first network function.

In certain embodiments, the first network function (e.g., the NEF or OAM entity) configures at least one second network function (e.g., UPF) with the policy identifier and configuration information to steer user plane traffic to a selected N6-LAN network and service function chain order according to the received configuration request. In one embodiment, the first network function and the network exposure function are the same network function. In another embodiment, the first network function is an OAM entity.

Disclosed herein is a third method for configuring N6-LAN chain policies, according to embodiments of the disclosure. The third method may be performed by an application function ("AF"), such as the AF 153, the ASP AF 201, and/or the network apparatus 700. The third method includes sending a discovery request to a first network function (e.g., a NEF or OAM entity) and receiving a discovery response from the network, the discovery response containing at least one available N6-LAN chain policy and a policy identifier for each available N6-LAN chain policy. The third method includes selecting first traffic that is to be routed to a selected N6-LAN network based on a selected N6-LAN chain policy, the first traffic associated with one of: a DNN, a network slice, and a user that is to be routed to the selected N6-LAN network. The third method includes sending a first request to a network exposure function (e.g., the NEF), the first request containing an external identifier (e.g., GPSI) for at least one UE and N6-LAN steering information indicating a chain of at least one service function in the N6-LAN that is to process the user-plane traffic associated with the at least one UE.

In some embodiments, the discovery request contains at least one of: A) a service provider identifier; B) at least one second external identifier; C) an area of interest; D) a data network name; and E) a network slice identifier. In some embodiments, the third method further includes translating the at least one second external identifier into at least one second permanent subscription identifier. In such embodiments, the forwarded discovery request contains the at least one second permanent subscription identifier, where the at least one available N6-LAN chain policy is identified using the at least one second permanent subscription identifier.

In certain embodiments, the N6-LAN steering information includes at least one of: A) an application identifier of an application having traffic to be routed in the selected N6-LAN network; B) a traffic filter of the application having traffic to be routed in the selected N6-LAN network; and C) a policy identifier of an N6-LAN chain policy that is to be enabled.

In some embodiments, the third method further includes: discovering a plurality of available N6-LAN networks and service functions within each N6-LAN network; selecting at least one N6-LAN network and at least one available service function and a service function chain order for the selected at least one service function within the selected N6-LAN network; sending a service chain request to the first network function (e.g., NEF or OAM) for configuring a N6-LAN chain policy corresponding to the selected N6-LAN network and at least one service function and the service function chain order within the selected N6-LAN network; and receiving a policy identifier for at least one N6-LAN chain policy from the first network function.

In certain embodiments, the first network function (e.g., the NEF or OAM) configures at least one second network function (e.g., UPF) with the policy identifier and configuration information to steer user plane traffic to a selected N6-LAN network and service function chain order according to the received configuration request. In one embodiment, the first network function and the network exposure function are the same network function. In another embodiment, the first network function is an OAM entity.

Disclosed herein is a fourth apparatus for configuring N6-LAN chain policies, according to embodiments of the disclosure. The fourth apparatus may be implemented by an OAM entity, such as the OAM 160, an OAM entity 203, and/or the network apparatus 700. The fourth apparatus includes a processor and a network interface that communicates with at least one network function in a mobile communication network. Via the network interface, the processor receives a service chain policy request from an AF. The processor configures at least one new N6-LAN chain policy and allocates a N6-LAN chain policy identifier for each new N6-LAN chain policy. The processor configures at least one first network function (e.g., UPF) with the policy identifier and configuration information to steer user plane traffic to a selected N6-LAN network and service function chain order according to the received service chain policy request. Via the network interface, the processor sends a service chain policy response to the AF, the service chain policy response containing a policy identifier for at least one N6-LAN chain policy. The processor updates a second network function (e.g., UDR) with the policy identifier and the at least one new N6-LAN chain policy.

In some embodiments, the second network function includes a Unified Data Repository ("UDR") storing the application data set. In such embodiments, updating the UDR may include invoking an Nudr_DM_Update service operation to add the new N6-LAN chain policy within the Policy Data of the UDR and to add the N6-LAN chain policy identifier as a Data Key of the new N6-LAN chain policy.

In some embodiments, the processor further receives a discovery request from the AF and sends a discovery response from the network, the discovery response containing at least one available N6-LAN chain policy and a policy identifier for each available N6-LAN chain policy, where the service chain policy request is received after sending the discovery response.

Disclosed herein is a fourth method for configuring N6-LAN chain policies, according to embodiments of the disclosure. The fourth method may be performed by an OAM entity, such as the OAM 160, an OAM entity 203, and/or the network apparatus 700. The fourth method includes receiving a service chain policy request from an AF and configuring at least one new N6-LAN chain policy. The fourth method includes allocating a N6-LAN chain policy identifier for each new N6-LAN chain policy and configuring at least one first network function (e.g., UPF) with the policy identifier and with configuration information to steer user plane traffic to a selected N6-LAN network and service function chain order according to the received service chain policy request. The fourth method includes sending a service chain policy response to the AF, the service chain policy response containing a policy identifier for at least one N6-LAN chain policy, and updating a second network function (e.g., UDR) with the policy identifier and the at least one new N6-LAN chain policy.

In some embodiments, the second network function includes a Unified Data Repository ("UDR") storing the application data set. In such embodiments, updating the UDR may include invoking an Nudr_DM_Update service operation to add the new N6-LAN chain policy within the Policy Data of the UDR and to add the N6-LAN chain policy identifier as a Data Key of the new N6-LAN chain policy.

In some embodiments, the fourth method further includes receiving a discovery request from the AF and sending a discovery response from the network, the discovery response containing at least one available N6-LAN chain policy and a policy identifier for each available N6-LAN chain policy, where the service chain policy request is received after sending the discovery response.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network entity for wireless communication, wherein the network entity is capable to:

receive a first request from an application function (AF), wherein the first request includes 1) an external identifier for at least one user equipment (UE) and 2) N6-LAN steering information, wherein the N6-LAN steering information indicates a chain of at least one service function in an N6-LAN for processing user-plane traffic associated with the at least one UE;

translate the external identifier to at least one permanent subscription identifier associated with the at least one UE; and send, to unified data repository (UDR), a second request to update an application data set to include 1) the N6-LAN steering information and 2) the permanent subscription identifier, wherein the application data set is used to identify the user-plane traffic associated with the at least one UE and to cause the identified user-plane traffic to traverse the chain of the least one service function in the N6-LAN.

2. The network entity of claim 1, wherein the N6-LAN steering information comprises one or more of a policy for routing the user-plane traffic to an N6-LAN network, an identifier of an application having traffic to be routed in the N6-LAN network, a filter for routing the traffic in the N6-LAN network, or an identifier of an N6-LAN chain policy.

3. The network entity of claim 2, wherein the network entity is further capable to determine whether a service provider associated with the first request is authorized to use the N6-LAN chain policy.

4. The network entity of claim 1, wherein the second request invokes an Nudr_DM_Update service operation for adding the N6-LAN steering information as a data subset of the application data set and for adding the permanent subscription identifier as a data key of the application data set.

5. A method for wireless communication performable by a network entity, the method comprising:

receiving a first request from an application function (AF), wherein the first request comprises 1) an external identifier for at least one user equipment (UE) and 2) N6-LAN steering information, wherein the N6-LAN steering information indicates a chain of at least one service function in an N6-LAN for processing user-plane traffic associated with the at least one UE;

translating the external identifier to at least one permanent subscription identifier associated with the at least one UE; and sending, to unified data repository (UDR), a second request to update an application data set to include 1) the N6-LAN steering information and 2) the permanent subscription identifier, wherein the application data set is used to identify the user-plane traffic associated with the at least one UE and to cause the identified user-plane traffic to traverse the chain of the least one service function in the N6-LAN.

6. A network entity for wireless communication, wherein the network entity is capable to:

receive, from a unified data repository (UDR), an update notification comprising N6-LAN steering information for one or more subscription identifiers;

generate at least one policy rule for at least one user equipment (UE) based on the N6-LAN steering information; and send the at least one policy rule to a network function for configuring a user plane route for a data connection of the UE.

7. The network entity of claim 6, wherein the N6-LAN steering information comprises one or more of a policy for routing traffic to an N6-LAN network, an identifier of an application having traffic to be routed in the N6-LAN network, a filter for routing the traffic in the N6-LAN network, or an identifier of an N6-LAN chain policy.

8. The network entity of claim 6, and wherein the update notification invokes an Nudr_DM_Notify service operation for notifying updated N6-LAN steering information.

9. A method for wireless communication performable by a network entity, the method comprising:

receiving, from a unified data repository (UDR), an update notification comprising N6-LAN steering information for one or more subscription identifiers;

generating at least one policy rule for at least one user equipment (UE) based on the N6-LAN steering information; and sending the at least one policy rule to a network function for configuring a user plane route for a data connection of the UE.

10. A network entity for wireless communication, wherein the network entity is capable to:

send a discovery request to a first network function;

receive a discovery response from the first network function, wherein the discovery response contains at least one available N6-LAN chain policy and a policy identifier for each available N6-LAN chain policy;

select first traffic for routing to a selected N6-LAN network based on a selected N6-LAN chain policy, wherein the first traffic is associated with one or more of a data network name (DNN), a network slice, or user-plane traffic associated with at least one user equipment (UE); and send a first request to a network exposure function, wherein the first request comprises 1) an external identifier for the at least one UE and 2) N6-LAN steering information, wherein the N6-LAN steering information indicates a chain of at least one service function in an N6-LAN for processing the user-plane traffic associated with the at least one UE.

11. The network entity of claim 10, wherein the discovery request contains at least one or more of a service provider identifier, at least one second external identifier, an area of interest, a data network name, or a network slice identifier.

12. The network entity of claim 10, wherein the first network function is the network exposure function.

13. A method for wireless communication performable by a network entity, the method comprising:

sending a discovery request to a first network function;

receiving a discovery response from the first network function, wherein the discovery response contains at least one available N6-LAN chain policy and a policy identifier for each available N6-LAN chain policy;

selecting first traffic for routing to a selected N6-LAN network based on a selected N6-LAN chain policy, wherein the first traffic is associated with one or more of a data network name (DNN), a network slice, or user-plane traffic associated with at least one user equipment (UE); and sending a first request to a network exposure function, wherein the first request comprises 1) an external identifier for the at least one UE and 2) N6-LAN steering information, wherein the N6-LAN steering information indicates a chain of at least one service function in an N6-LAN for processing the user-plane traffic associated with the at least one UE.

14. The method of claim 13, wherein the discovery request contains at least one or more of a service provider identifier, at least one second external identifier, an area of interest, a data network name, or a network slice identifier.

15. The method of claim 13, wherein the first network function is the network exposure function.

\* \* \* \* \*